Patented Sept. 11, 1951

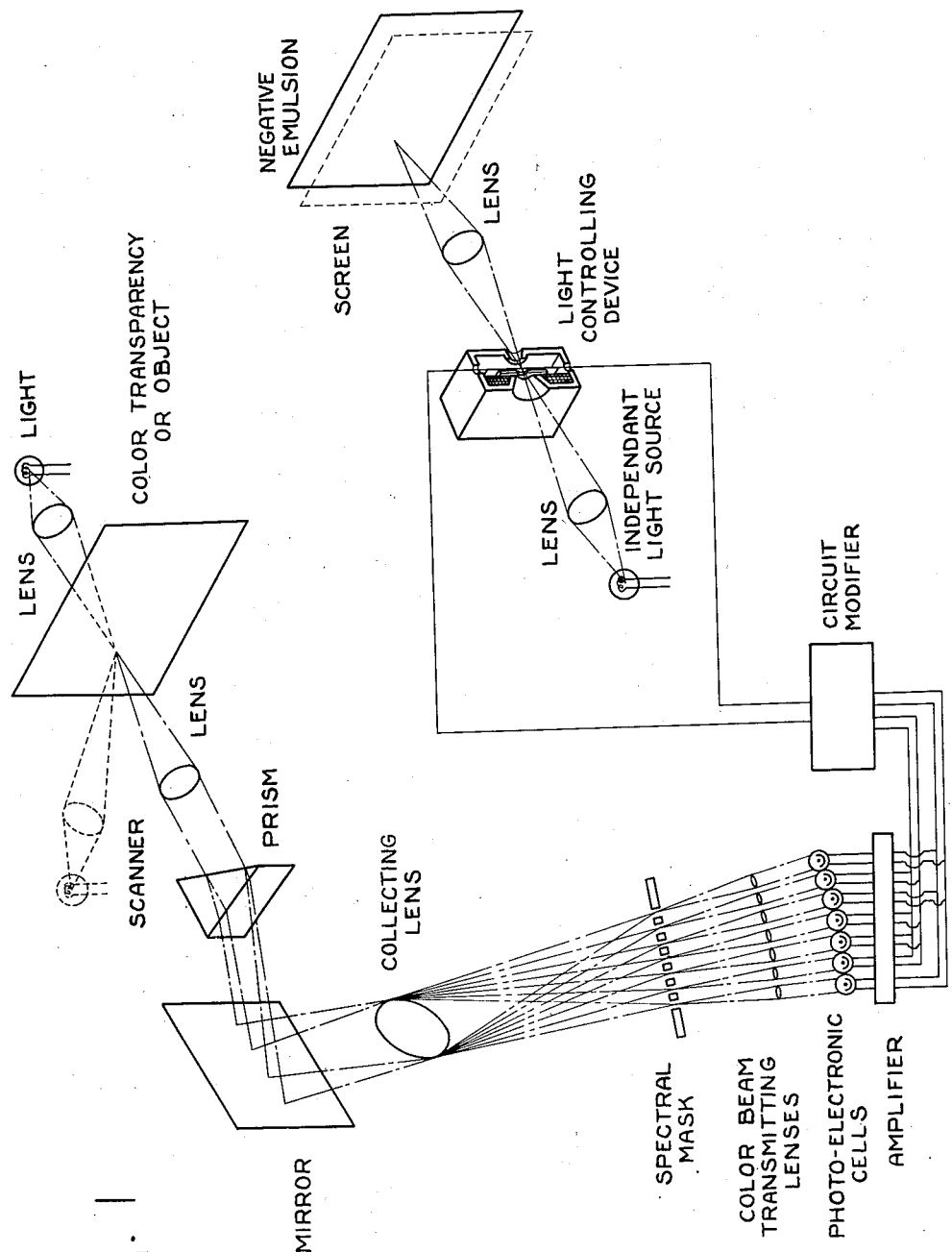

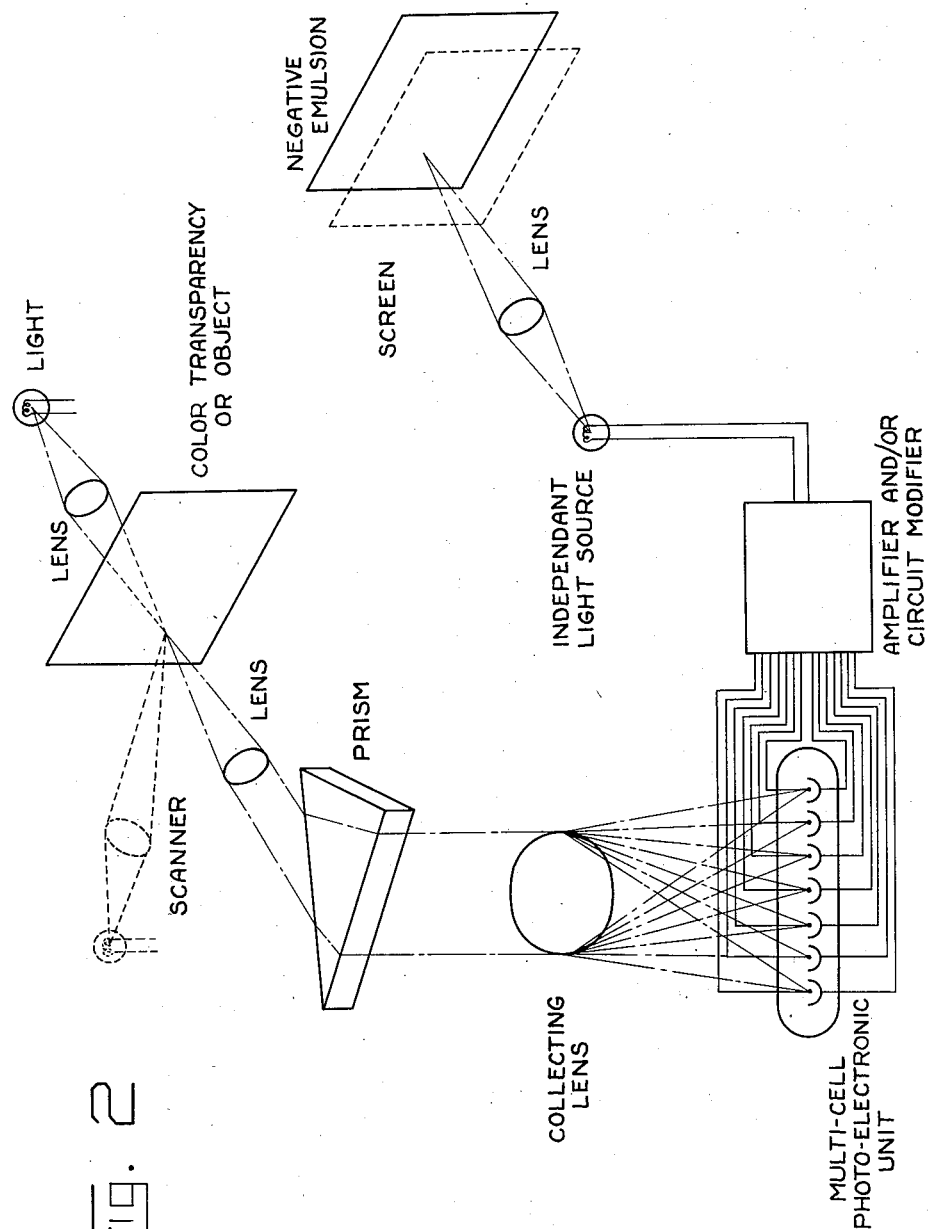

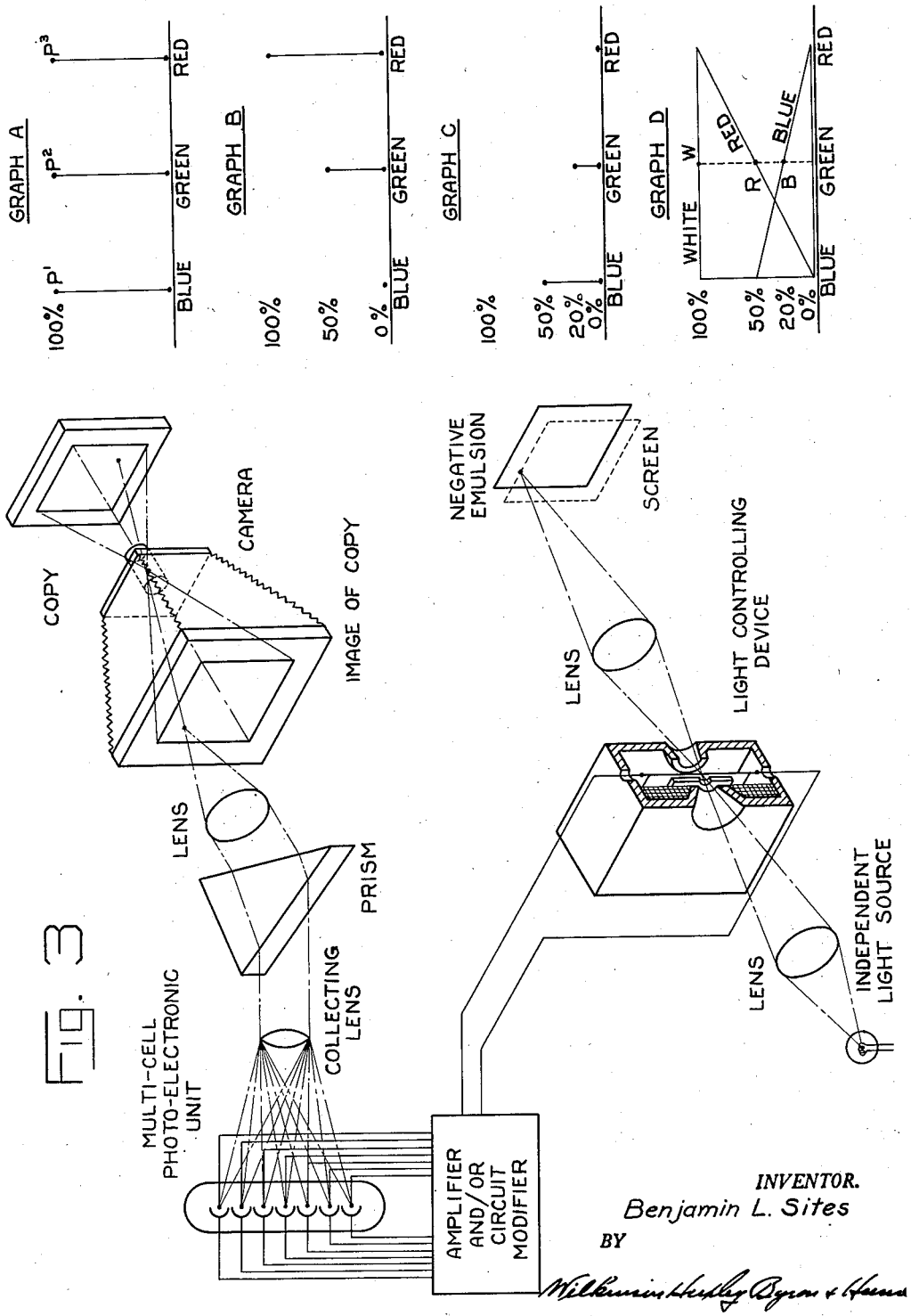

2,567,240

UNITED STATES PATENT OFFICE 2,567,240

COLOR FACSIMILE SYSTEM

Benjamin L. Sites, Elmhurst, Ill., assignor, by mesne assignments, to Miehle Printing Press and Manufacturing Company, Chicago, Ill., a corporation of Delaware Application October 29, 1947, Serial No. 782,866

8 Claims. (Cl. 178—5.2)

1

This invention, while not limited thereto, relates in general to the art of making printing plates for use in the graphic industry. It more specifically pertains to a novel method of producing color separation transparencies direct from multi-colored subjects, which may include paintings, water colors, pastels, drawings, carbros, or any other opaque colored originals viewed by reflected light, as well as any type of multi-color photographic transparencies, such as Kodachrome and the like, viewed by transmitted light.

Furthermore, multi-colored light images such as are formed in a camera, may also be referred to as original subjects in accordance with certain aspects of the invention.

The underlying feature whereby my invention is accomplished resides in the introduction of electronic principles, including the use of photoelectric cells and appropriate electric circuits as applied in connection with the color bands of a spectrum produced by a prism, or by any other suitable means, such as filters for example.

My invention furthermore contemplates the production of true color corrected separation transparencies for the making of printing plates directly from the original subject without resorting to panchromatic emulsions in any of the steps in the procedure of making such tranparencies.

I am aware that in the production of multi-colored images certain methods have been followed which control a primary color of a color system by subtracting linearly the effect of a certain spectral color component emitted from the original subject from the effect of a different spectral color component of the same light emitted from the original subject. In other words, from the light emitted from the original subject, two different predetermined spectral color components are selected, so that the ultimate light effect obtained by subtracting the light effect of the two different spectral components in appropriate manner is utilized to produce the monochrome image which is used to control a given primary of a known color system.

In such procedure two components only of the light emitted from the original colored subject are utilized in making the primary controlling image. Furthermore, records are made of these two spectral components in panchromatic emulsions and finally, these records are employed either by photographic procedure or electrically in order to produce the primary controlling image.

Other known procedures include the production of a second positive photographic transparency made from a first negative transparency, in

2 which the power of transmission of the second positive transparency is directly proportional to the per cent of intensity of the reflected light emitted by the original subject which is being photographed. In other words, for every practical density in the first negative transparency a means is provided to produce an altered density in the second positive transparency. Furthermore, no means is contemplated for compensating for true color separation in the making of the first or second transparency.

If in such procedures color work is involved, then panchromatic emulsions are essential.

As distinct from such prior procedure, I utilize more than two spectral components of emitted light in making a primary controlling image. In fact, the invention is based on the use of all the spectral components of the emitted light from the colored subject in the form of beams each having a width which is substantially one-Nth of the spectrum where N is the total number of beams. It will be understood that as regards any one beam, the same will therefore be less than a major portion of the spectrum and will have an exact composition as regards its spectral components. Moreover, no intermediary records are employed, therefore, the need for panchromatic emulsions is eliminated, and, since no records are being used, the question of combining such records photographically or electrically is not involved. According to my improved method, the primary controlling image is made directly by using optical and electrical means only.

It is therefore one of the primary objects of my invention to produce one or more color corrected, separation transparencies direct onto elements having black and white sensitive emulsion only, without the conventional intermediary photomechanical steps, panchromatic emulsions or such like conventional means. Such procedure is more economical than others known heretofore, is positively reliable as to accurate color reproduction, and requires less skill on the part of the operator.

Another salient object of the invention resides in the method of producing color separation transparencies, which method consists in the steps of passing light coming from a multi-colored original subject, whatever its nature may be, through a dispersion medium such as a prism, filters or equivalent elements, then separating the dispersed light into multiple color beams, converting the light energy from the individual color beams into electrical energy, photoelectrically modifying and mixing said electrical energy in a predetermined manner, and utilizing the output of said modifying and mixing operation to modulate, that is to say, to control the intensity of a beam of white light, which is caused to expose a light sensitive element of the non-panchromatic type, to thereby produce a true color corrected separation transparency.

A further object of my invention consists in the production of true, color corrected, screened, separation transparencies for the making of color process printing plates by placing a screen in juxtaposition of the photographic sensitive element having a black and white emulsion, and impinging through such screen the modified beam upon said element.

A still further object of the invention resides in carrying out my novel method of producing color separated and color corrected printing plates, by the introduction of means whereby the illuminated multi-colored original is scanned and likewise the exposure onto the light sensitive transparency is made by scanning such transparency.

A still further object of my invention resides in the production of a half-tone, i. e. screened color corrected and color separated transparency direct without going through the steps of first making a continuous tone transparency.

Still further objects of my invention will become apparent from the description given herein and from the scope of the appended claims when read in conjunction with the accompanying diagrammatic illustrations, wherein Figure 1 is a diagrammatic illustration of a preferred system of the invention and which is characterized by the use of a spectral mask for the purpose of independently selecting the spectral components constituting the multiple color beams and for controlling their respective intensity.

Figure 2 illustrates diagrammatically a modification of the invention wherein the spectral mask is eliminated and a multiple cell photoelectric unit is substituted for the individual photo-electric cells; and Figure 3 illustrates diagrammatically another modification of the invention wherein the system is adapted for picking up the image of a camera.

Some of the principal steps involved for carrying my invention into practice are:

1. A multi-colored subject is scanned with a beam of white light. The subject may be opaque or transparent as indicated herein, or as an alternative, an image of the original is formed in a camera, and then this image is scanned with a pickup device, which delivers a beam of light to a dispersion member.

2. The reflected, transmitted or "pickup" beam after passing through the dispersion member is converted into a multiple number of beams, each having a width which is substantially one-Nth of the spectrum where N is the total number of beams all as illustrated by the drawings.

3. The multiple number of beams are divided into two groups, each group being composed of only those beams having like signs for their amplification factors as can be determined by calculation.

4. The light energy of each individual beam is converted into electrical energy and amplified and mixed in accordance with their individual predetermined amplification factors.

5. The resultant electrical energy from the algebraic mixing of step 4 is utilized to control the intensity of a light source in a desired manner.

6. A beam of light from the controlled light source is made to expose, by scanning, a photographic emulsion having so called "black and white" characteristics, that is, non-panchromatic in type.

7. The exposure of step 6 may be made through a screen if desired in order to obtain screened color separation transparencies.

In order to illustrate clearly the problem involved in carrying my invention into practice, I will now describe a typical example.

In a true color separation negative of an original the colors represented therein should be separated into two groups, one group recording in a manner identical to white, the other group recording the "so called" separated colors in their true tonal values. For instance, a true "red" separation negative representing an American flag, with the supposition that the red and blue were primary colors, would record the blue and white in an equal manner, namely dense and indistinguishable, and red, the separated color, as a transparent area. Thus the stars and the blue field would appear as a solid uninterrupted area of dense silver deposit equal in density to the white stripes. The red stripes would appear transparent.

It is recognized that the present day method of making separation negatives through the green "B" filter does not give this true condition, and various ways have been devised for making up this deficiency. A major portion of the fault lies in the fact that the reflecting properties of the colors are not conducive to obtaining the desired ultimate result. For direct color separation, some method must be devised to compensate automatically for this deficiency while the negative is being made.

If white light is permitted to fall on the flag, it is a known fact that the intensity of the reflected light varies according to the color area from which it is reflected, even though all colors may be of equal weight. If the white light is replaced by colored beams of monochromatic light, the same condition remains true, however, the relative proportionality will vary with each color of light used.

This may be illustrated graphically as shown in graphs A to D inclusive on Sheet 3 of the drawings.

Consider the abscissae to represent the wave length of the color of light falling on the flag, each light having an intensity equivalent to the others, then the colors will be represented from left to right in the order of blue, green and red. The ordinates will represent the intensity of the reflected light, in approximate values only, for the purpose of illustration, but very nearly equal to the actual facts.

On the above basis the graph for the white of the flag would be as depicted in graph A of the drawings where the points P1, P2, P3 represent approximately 100% intensity for the reflected blue, green, and red lights respectively.

For the red of the flag, graph B is applied, and for the blue of the flag, graph C applies.

Representing the above data on one graph and connecting the individual points representing each color, the composite graph D results.

Thus a green light falling on blue will be reflected to the amount of 20% of the initial intensity of the green light; red will reflect 50% and white 100%. These are represented by points B, R and W respectively in graph D.

Consider graph A. It will be noted that if a negative were made of the white areas under the influence of the blue, green and red light, and if the blue, green and red, each had an equal density effect on the silver emulsion of the negative, then the white area would affect the emulsion by 300% total energy. If under these conditions, the negative were processed to give a density equal to 1, this would establish the unit density for the "so called" unseparated colors. Thus, in a red separation negative, blue and white must, under the same processing conditions, be represented in the negative as a density of 1, while red should have a density of 0. It is understood that these values are used merely for purposes of illustration and are in no way to be construed as being essential in order to practice the method which constitutes my invention.

Applying the above reasoning to graph D, and to make a red separation negative, the total light energy reflected from the white areas of the flag and the total energy reflected from the blue of the flag should have an equal effect of exposure on the silver emulsion, so as to produce an equal density for these two areas, upon development of the emulsion. Simultaneously, the effect of the total energy reflected from the red areas should be nil.

To accomplish the above, I conceived that the energy of the reflected colored beams could be converted to electrical energy and individually be amplified or altered by a proper amount so that the combined effect of the beams would have the proper total energy to produce the densities desired in the silver emulsion.

Let it be assumed that in order to carry out the above conception, the reflected blue light would have to be amplified by a factor $a$, the reflected green light by $b$, and the reflected red light by $c$. Then by referring to graph D, it will be noted that the total energy effect of the blue beam of light, when reflected from a white area, would be $1a$, since 100% of the reflected blue beam is available for amplification and it is to be amplified "$a$" times. In the same manner, the total energy effect of the green light would be $1b$, and for the red beam $1c$; or the total energy from all three beams would be the sum of these, or $1a+1b+1c$. As was stated above, with the proper development procedure, this total energy would be made equivalent to a developed density of 1 in the transparency produced. Therefore, an equation may be set up to represent the conditions prevalent when the three beams are reflected from white areas as follows:

$$1a+1b+1c=1$$

Using the same reasoning as above and referring to graph D, it may be seen that the conditions prevailing for the cases where the three beams are reflected from the blue and red areas respectively, descriptive equations may be set up as follows:

$$.5a+.2b+0c=1$$

and $$0a+.5b+1c=0$$

Since these are three equations involving three unknowns, it is possible to solve for the values $a$, $b$ and $c$, which are the amplification factors desired.

Solution:

(1) $a+b+c=1$
(2) $.5a+.2b=1$
   $.5b+c=0$ (1)—(3)  $a+.5b=1$
   (2)  $.5a+.2b=1$ (4)  $.5a+.25b=.5$
   (2)  $.5a+.2b=1$ (4)—(2)  $.05b=-.5$
   $b=-10$ $a-5=1$
   $a=6$ $6-10+c=1$
   $c=1+4=5$

Therefore:
$a=+6$
$b=-10$
$c=+5$

It will be noticed that $a$ and $c$ are positive numbers while $b$ is negative, which means that $a$ and $c$ are positive amplification factors, while $b$ is negative, or in other words, $b$ imparts an opposite effect to that of $a$ and $c$. That is, the combined light energy of the blue and red beams is utilized to build up silver density in the photographic emulsion, whereas the light energy of the green beam should act to dissolve or decrease the silver density in the photographic emulsions. Obviously, in ordinary photographic exposures, this effect is impossible in a single exposure operation. I am aware that the patented prior art teaches how this problem might be approached by resorting to auxiliary photographic exposures made on color sensitive panchromatic emulsions, and then aided by supplementary masks, to arrive at an appropriate result. Such a procedure is outlined in the patent to A. C. Hardy, No. 2,193,722. However, I arrive at the desired result directly without resorting to panchromatic emulsions or the auxiliary exposures and masks. It will be apparent to those skilled in the art that this fact will greatly simplify the procedure of making color separation transparencies, in that the operator is free from the disturbances caused by the varying color sensitive characteristics of different batches of panchromatic emulsions, and the tedious and exacting technique occasioned by the demand for producing accurate masks of definite density ranges so as not to impair the color balance of the transparency being corrected. To accomplish the above desired result, I proceed in the following manner:

As stated above, one interpretation of the negative quantity is that the green light should act in a manner opposite to the red and blue lights and while this is impossible when dealing with light directly, it will be possible to create this effect if the energy represented by the reflected lights is transformed to electrical energy. For example, the energy created by the green light can be substracted from the total energy generated by the red and blue lights, and the difference in this electrical energy is made to control a light source which acts upon a non-panchromatic photographic emulsion, the intensity of this light source being altered by the integrated energy controlled by the reflected lights.

Instead of actually having three different colored lights, a single beam of white light is made to scan the original. This beam is reflected back preferably through a prism system, which breaks up the white beam into the blue, green and red beams, by appropriate blocking off of parts of the spectrum. The colored beams are then directed to act upon individual photo cells, and the energy output of each cell amplified according to the necessary ratios, such as 6, 10 and 5, depending on each individual case, and the energy from the red and blue cells added together. From this added energy, the energy from the green light cell is substracted, and the remaining energy is utilized to modify an independent light source which acts upon a light sensitive black and white emulsion at points corresponding with the scanned points of the original.

It shall be understood, furthermore, that the herein described method becomes increasingly more accurate as the number of light beams are supplemented. I believe however, that for commercial work of high reproductive quality, seven such light beams will be sufficient. I have therefore chosen to hold the disclosure of my invention to the showing of that number of beams. It will be clearly understood, however, that I do not wish to limit the broad concept of my invention to any specific number of such beams.

It is also evident that a complete set of the required separation transparencies for producing the yellow, red, blue and perhaps the black plates for process work could be made simultaneously by dividing the reflected scanning beam or beams into the corresponding sets of analyzing circuits, i. e. one for each color.

Since it will be apparent to anyone acquainted with this art that according to the principle disclosed herein, it will be readily practical, with the above described means, to produce a set of two or more color separation transparencies, I have not deemed it essential to describe and illustrate each alternative in detail.

However, a preferred procedure would include the provision of a corresponding number of dispersion devices and to eventually impinge each independent, intensity controlled beam upon an individual photosensititve element of the non-panchromatic type.

By placing a screen in front of the light sensitive emulsion of the element to be scanned, it will also be possible to produce directly one or more screened color corrected separation transparencies, thereby eliminating the conventional step of first making continuous tone transparencies and then introducing a screen for the purpose of producing screened transparencies.

To accomplish this, the following procedure could be adopted.

The beam of light resulting from the electro-optical control falls upon a sensitive photographic emulsion after it has passed through a contact or other type of screen. This screen is preferably made in such a way that the unit area of the screen is so constructed that shading is accomplished by a vignette, the exact amount and degree of vignetting to be determined in accordance with the desired characteristic of the screened transparency produced from it. In operation the scanning beam of light first passes through this screen and then falls upon the sensitive photographic emulsion. If the photographic emulsion is of a contrasty type, the action of this light beam will be such that when the contrast emulsion is developed there will be produced in it, dots, one for each unit of the screen, and each dot will have a size proportionate to the tone value of the original subject being reproduced, the dots being formed by the combined action of the varying light intensities of the scanning beam and the degree of vignetting of the screen unit.

For the purpose of describing my invention graphically and merely by way of example, I have illustrated in the accompanying drawings three practical and preferred systems, whereby the improved method can be applied to practice for producing direct from a colored original, true color corrected separation transparencies for the making of printing plates.

I will point out here that the term "scanner," "scanning device" or "pick-up" is applied herein in the broadest sense of its meaning, and may include any suitable means and/or commercially available apparatus whereby this particular function of "scanning" the original subject can be accomplished, in other words to produce a beam of light from the original subject, no matter what the set-up may be.

I make no claim here to the structure or characteristics of such now commercially available devices, nor to any other contributing and/or auxiliary apparatus and means which I select for the purpose of accomplishing the principle of my invention. Such means may include a multi-cell photo-electric unit, amplifier, circuit modifier, light controlling device, etc., as will be understood from the following description.

According to the procedure illustrated schematically in Figures 1 and 2, the multi-colored original or copy, which may be opaque or transparent, is suitably illuminated by white light.

When the color separation transparencies are to be produced from an original which is opaque, then the entire surface, or that part of it which is to be reproduced, is illuminated and scanned.

As an alternative procedure, the opaque object can be illuminated and scanned by means of a beam of white light, as indicated in broken lines, so as to illuminate the points to be scanned. If the multi-colored object is a transparency, then the beam of white light is applied to project through it to likewise illuminate in succession all points of the original object for scanning.

Referring now more specifically to Figure 1, and assuming that the object is a colored transparency, the light transmitted through it is picked up by a scanner and then concentrated by means of an optical system and passed through a prism where the light beam is broken up into its spectral component colors, which by the intermission of a reflecting element, if desired, and a collecting lens, may be caused to pass through a spectral mask and a series of seven individual color beam transmitting lenses, to thereupon act individually upon independent photoelectronic elements or cells.

The energy output of each one of said cells is then amplified or modified by a system of amplifiers and modifiers according to a predetermined value. The modified energy output from a selected group or set of color beams is added electrically. From this added energy output is subtracted the added modified energy output from another set of selected color beams. The remaining energy is then utilized to modify a light beam from an independent light source, preferably through the medium of a light controlling device of a type well known in the field of light controlling apparatus.

A selected group or set of color beams is composed of all those beams which have amplification factors bearing the same algebraic sign, either plus or minus, as determined in a manner similar to the above example given to illustrate the principle of the invention. It may be said here that each band need not necessarily be a monochromatic band, but may embrace a portion of the spectrum, and also, these portions need not necessarily be of equal width.

The modified light beam is then impinged through a lens upon a light sensitized plate or the like, having black and white emulsion, by scanning the areas corresponding to the scanned areas of the multi-colored subject. In order to obtain a screened transparency, a screen is placed in front of said plate either in contact therewith or at any suitable distance relative thereto, as indicated in broken lines.

According to the modified method illustrated in Figure 2, the procedure, while the same in principle as depicted in Figure 1, is somewhat different in detail.

The characteristic difference in this modified system as compared with that described in connection with Figure 1, lies principally in the introduction of an electronic tube which contains a multi-cell photo-electronic unit and which replaces the mirror, spectral mask, color beam transmitting lenses and the set of individual photo-electronic cells, such as are depicted in Figure 1. Accordingly, in Figure 2 the spectrum i. e. the multi-color bands emanating from the prism are collected by a lens and directed onto the multi-cell photo-electronic unit which contains preferably seven separate photo-sensitive electronic elements. Each one of these elements receives energy from portions of the spectrum. Then, after amplifying the energy output of each one of these cells in said unit, and after modifying the circuits by the intermediary of suitable amplifying and circuit modifying means, the remaining energy is utilized to modify a light beam from an independent light source. The photographic emulsion on the element which is to become the color corrected separation transparency, is then scanned by this modified light beam, either direct or by the intermission of a screen, in order to obtain either a continuous tone or a screened color corrected separation transparency.

The modification illustrated in Figure 3 is in substance a combination of the systems disclosed in Figures 1 and 2. The radical departure however consists in the feature of creating a photographic image of the multi-colored original by the introduction of a camera, and in this event, the photographic image is scanned.

With such an arrangement, one could readily produce a color corrected separation transparency which could either be an enlarged or a reduced reproduction of the original copy.

From the point where the photographic image in the camera is picked up by the scanner, the procedure of the method is similar to that disclosed in Figures 1 and 2, namely the picked up beam of light is dispersed by means of a prism, then passed through a collecting lens and impinged upon the multi-cell photo-electronic unit of the general type indicated in Figure 2.

The energy output of each one of the photoelectronic cells contains in said unit is then modified and amplified by a system of amplifiers and modifiers according to a predetermined value as described in conjunction with Figure 1. The remaining energy is then utilized to modify a light beam from an independent light source and preferably through a light controlling device of the type illustrated in Figures 1 and 3, and the modified light beam is then impinged through a lens upon a light sensitized element by scanning, and in order to obtain a screened color corrected separation transparency a screen may be placed in front of the element, similar as described in connection with Figures 1 and 3 and as indicated in broken lines in Figure 3.

The basic concept of the invention as disclosed in all three figures of the drawings accordingly consists in scanning the colored subject to be reproduced, resolving the scanning beam into a plurality of beams of exact composition as regards their spectral components with little or no overlap, and wherein each beam is a minor portion of the spectrum, having a width which is substantially one-Nth of the spectrum where N is the total number of beams. The light energy from the several beams is converted into electric currents which are amplified according to a preselected set of amplification factors based upon reflectivity curves of a set of primary colors used in the final reproduction. The amplified currents are then mixed by adding them algebraically and by so doing a single current results which is the composite of all the beams, the energy of which may be used for producing a single continuous or screened color-separation transparency or a single color-separated process printing plate.

The theory on which my novel method and systems for carrying the method into effect are based, could readily be demonstrated by way of charts, tables and calculations, which I have developed and compiled to prove the practicability of the invention. However, in order to present its fundamental principles adequately and in a simple manner, I have chosen to disclose them graphically by way of the three accompanying sheets of drawings, whereby I believe the invention is clearly disclosed to anyone acquainted with this art.

I also wish it to be understood that systems other than those illustrated herein could be adopted for the purpose of successfully practicing my invention without departing from its basic principle and from the scope and interpretation of the appended claims.

For example, instead of using a prism in the manner illustrated and described herein, a set of suitable color filters could be applied with reasonably satisfactory results.

Furthermore, different combinations of the elements, other than the combinations described and disclosed in the drawings, could be used successfully.

Therefore, it shall be understood that the disclosure made herein is merely to illustrate, by way of example, a manner in which my invention can be carried out in practice and that accordingly, I intend to cover any modifications in the system and method of producing color corrected separation negatives that will come within the meaning and scope of the appended claims.

I claim:

1. The method of producing a corrected color-separation transparency from a colored original, which consists in passing a scanning beam of light emitted from said colored original through a color analyzer for independently selecting a plurality of beams each comprising substantially one-Nth of the spectrum where N is the total number of beams, converting the light energy from the color beams respectively into electrical currents through the medium of electronic photo cells, amplifying each of said electric currents according to amplification factors predetermined by calculation based on the reflectivity characteristics of the pigments to be used in printing the reproduction and the response characteristics of the photographic emulsion of the corrected color-separation transparency to be produced, combining said electric currents by adding the currents algebraically according to the sign of their amplification factor, using the current output from said last mentioned operation to modulate an independent beam of light, and directing said modulated beam of light onto a light sensitive element to produce the said corrected color-separation transparency.

2. The method of producing a corrected color-separation transparency from a colored original, which consists in passing a scanning beam of light emitted from said colored original through a color analyzer for multiple band-pass beam selection for independently selecting a plurality of beams of predetermined composition as to wave length and intensity with each beam comprising substantially one-Nth of the spectrum where N is the total number of beams, converting the light energy from all the individual color beams into electrical energy respectively, modifying the respective electrical energies in accordance with amplification factors predetermined for the particular color-separation transparency to be produced, mixing said amplified electrical energies, utilizing the output of the mixing operation to modulate an independent beam of light, and directing said modulated beam of light onto a light sensitive element to produce the said corrected color-separation transparency.

3. In a method as defined by claim 2 wherein additional different color corrected color-separation transparencies are produced by modifying the electrical energies corresponding to the multiple color beams in accordance with predetermined amplification factors calculated for each different transparency, mixing the said amplified electrical energies for each transparency by adding the same algebraically, utilizing the output of each mixing operation to modulate an independent beam of light and directing each of said modulated beams of light onto a light sensitive element for producing each additional color-separation transparency.

4. The method of producing a color process printing plate for use in reproducing an original colored subject, which consists in scanning the original subject to produce a scanning beam of light, passing said scanning beam of light through a color analyzer for multiple band-pass beam selection for independently selecting a plurality of beams each comprising substantially one-Nth of the spectrum where N is the total number of beams, converting the light energy from the individual color beams into electrical energy respectively, modifying the respective electrical energies in accordance with amplification factors predetermined by calculation for the particular color process printing plate to be produced and based on the reflectivity characteristics of the pigments to be used in printing the reproduction, combining said amplified electrical energies in a manner determined by the amplification factors, and utilizing the current output of said last mentioned operation to modulate an independent beam of light for producing said color process printing plate.

5. The method of producing a color process printing plate for use in reproducing an original colored subject, which consists in scanning the original subject to produce a scanning beam of light, passing said scanning beam of light through a color analyzer for multiple band-pass beam selection for independently selecting a plurality of beams each comprising a minor portion of the spectrum and each beam having a spectral composition of predetermined exactness, converting the light energy from the individual color beams into electrical energy respectively, modifying the electrical energies individually by amplification, the extent of which for each electrical energy is based on certain factors obtained by calculation involving a consideration of all said beams, combining said amplified electrical energies in a manner as determined by the amplification factors, and utilizing the current output of said last mentioned operation to modulate means for producing said color process printing plate.

6. The method of producing a corrected color-separation transparency from a multi-colored subject, which consists in the steps of scanning the subject to produce a single scanning beam of light originating from a point in the subject, passing said scanning beam through a color analyzer for multiple band-pass beam selection for independently selecting a plurality of beams each comprising less than the major portion of the spectrum and having substantially an exact composition as regards their spectral components, converting the light energy in each of said color beams to electrical energy, amplifying the electrical energies respectively, according to predetermined amplification factors having a positive or negative sign, combining the amplified electrical energies of those color beams having positive amplification factors, subtracting from the total of these combined energies the added electrical energies of those beams having negative amplification factors, utilizing the resultant electrical energy to modify an independent source of light, and exposing a photographic emulsion to the modified light emanating from said source by scanning said emulsion in synchronism with the scanning of the original colored subject.

7. The method of producing a corrected color-separation transparency from a multi-colored subject, which comprises scanning the subject to produce a single scanning beam of light originating from a point in the subject, converting said scanning beam into a plurality of color beams by passing the scanning beam through a color analyzer for selecting the beams in accordance with an exact predetermined spectral composition, and wherein each of said beams comprises a minor portion of the spectrum, converting the light energy of each of said color beams to electrical energy, modifying the electrical currents individually by amplification, the extent of which for each current is based on certain factors obtained by calculation involving a consideration of all said beams, mixing said electric currents by adding the currents algebraically according to the sign of their amplification factor, using the resultant electric energy to control the intensity of an independent source of light, and exposing a photographic emulsion to the modified light emanating from said source by scanning said emulsion in synchronism with the scanning of the original colored subject.

8. The method of producing a screened, color-corrected color separation transparency from a colored original, which consists in passing a beam of light emitted from said colored original through a color analyzer for multiple band-pass beam selection for independently selecting a plurality of beams of predetermined composition as to wave length and intensity, with each beam comprising a minor portion of the spectrum, converting the light energy from each individual color beam into an electric current through the medium of an electronic photo cell, modifying the respective electrical currents in accordance with amplification factors predetermined for the particular color separation transparency to be produced, mixing said amplified electrical currents algebraically, utilizing the output of the mixing operation to modulate an independent beam of light, and directing said modulated beam of light through a screen onto a light sensitive element to produce a screened, color-corrected color separation transparency.

BENJAMIN L. SITES.

REFERENCES CITED

The following references are of record in the file of this patent:

UNITED STATES PATENTS

| Number | Name | Date |
|---|---|---|
| 2,136,340 | Hardy | Nov. 8, 1938 |
| 2,165,168 | Hardy | July 4, 1939 |
| 2,183,524 | Yule | Dec. 19, 1939 |
| 2,183,525 | Yule | Dec. 19, 1939 |
| 2,193,722 | Hardy | Mar. 12, 1940 |
| 2,231,668 | Hall | Feb. 11, 1941 |
| 2,231,669 | Hall | Feb. 11, 1941 |
| 2,253,086 | Murray | Aug. 19, 1941 |
| 2,272,638 | Hardy | Feb. 10, 1942 |
| 2,278,940 | Murphy | Apr. 7, 1942 |
| 2,286,730 | Hall | June 16, 1942 |
| 2,313,542 | Hall | Mar. 9, 1943 |
| 2,313,543 | Hall | Mar. 9, 1943 |
| 2,316,581 | Hardy | Apr. 13, 1943 |
| 2,413,706 | Gunderson | Jan. 7, 1947 |
| 2,415,051 | Thompson | Jan. 28, 1947 |
| 2,422,778 | Finch | June 24, 1947 |
| 2,434,561 | Hardy | Jan. 13, 1948 |